United States Patent
Ishibashi et al.

(10) Patent No.: US 8,007,256 B2
(45) Date of Patent: Aug. 30, 2011

(54) ELECTROMAGNETIC RECIPROCATING FLUID DEVICE

(75) Inventors: Shigemitsu Ishibashi, Tokyo (JP); Haruki Nakao, Tokyo (JP); Fuminori Hirose, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 836 days.

(21) Appl. No.: 11/988,573

(22) PCT Filed: Jul. 10, 2006

(86) PCT No.: PCT/JP2006/313698
§ 371 (c)(1),
(2), (4) Date: Jan. 10, 2008

(87) PCT Pub. No.: WO2007/007721
PCT Pub. Date: Jan. 18, 2007

(65) Prior Publication Data
US 2009/0081058 A1 Mar. 26, 2009

(30) Foreign Application Priority Data
Jul. 11, 2005 (JP) .................... 2005-202334

(51) Int. Cl.
*F04B 17/04* (2006.01)
*F04B 35/04* (2006.01)

(52) U.S. Cl. ........ 417/418; 417/417; 417/401; 417/404; 417/534

(58) Field of Classification Search .......... 417/417, 417/418, 214, 404, 401, 534–537
See application file for complete search history.

(56) References Cited

U.S. PATENT DOCUMENTS

| | | | |
|---|---|---|---|
| 3,936,245 A | 2/1976 | Hilgert | |
| 4,538,964 A * | 9/1985 | Brown | 417/267 |
| 4,854,833 A | 8/1989 | Kikuchi et al. | |
| 4,867,656 A | 9/1989 | Hirose | |
| 5,011,379 A * | 4/1991 | Hashimoto | 417/360 |
| 6,326,706 B1 * | 12/2001 | Zhang | 310/12.31 |
| 6,540,491 B1 | 4/2003 | Tanabe | |
| 6,572,348 B2 | 6/2003 | Sakurai et al. | |

(Continued)

FOREIGN PATENT DOCUMENTS

GB 2241287 8/1991

(Continued)

OTHER PUBLICATIONS

Supplementary European Search Report issued Apr. 14, 2011 in corresponding European Application No. 06768060.3.

*Primary Examiner* — Charles G Freay
*Assistant Examiner* — Christopher Bobish
(74) *Attorney, Agent, or Firm* — Wenderoth, Lind & Ponack, L.L.P.

(57) ABSTRACT

An electromagnetic reciprocating fluid device in which a movable member is equipped with permanent magnets, resists a torque rotating the movable member about an axis thereof in the reciprocating direction. The electromagnetic reciprocating fluid device has a pair of electromagnets facing each other, and permanent magnets disposed in a space between the opposed electromagnets and held by a movable member. When an alternating current is applied to coils formed in the electromagnets, a magnetic force is generated between the electromagnets and the permanent magnets, whereby a driving force for reciprocation is applied to the movable member. One end of the movable member is connected to a piston of a first piston-cylinder assembly, while the other end is connected to a piston of a second piston-cylinder assembly. The first and second piston-cylinder assemblies are arranged such that an axis line of the first piston-cylinder assembly and an axis line of the second piston-cylinder assembly are non-coaxial and vertically offset from an axis of the movable member.

3 Claims, 11 Drawing Sheets

U.S. PATENT DOCUMENTS

| | | | |
|---|---|---|---|
| 7,665,510 B2 * | 2/2010 | Nara et al. ............... 165/104.28 |
| 2001/0051099 A1 | 12/2001 | Yatsuzuka et al. | |

FOREIGN PATENT DOCUMENTS

| | | |
|---|---|---|
| JP | 52-141607 | 10/1977 |
| JP | 57-30984 | 7/1982 |
| JP | 62-116185 | 7/1987 |
| JP | 63-63586 | 4/1988 |
| JP | 3-104188 | 10/1991 |
| JP | 10-169550 | 6/1998 |
| JP | 2002-213354 | 7/2002 |
| JP | 2003-056466 | 2/2003 |

* cited by examiner

ELECTROMAGNETIC RECIPROCATING FLUID DEVICE

BACKGROUND OF THE INVENTION

I. Technical Field:

The present invention relates to an electromagnetic reciprocating fluid device, such as a pump and a compressor, which reciprocates a piston by generating an alternating magnetic field by means of electromagnets.

II. Description of the Related Art:

Such electromagnetic reciprocating fluid devices are generally divided to two types. In the first type, a magnetically attractable portion made of a magnetic material is disposed on a movable member (a piston rod) connected to a piston and the movable member is reciprocated by electromagnetic attraction force periodically generated by electromagnets to act on the magnetically attractable portion and spring force biasing the movable member in a direction opposite to the direction in which the magnetically attractable portion is attracted by the electromagnetic attraction force. In the second type, the movable member is equipped with a permanent magnet, and the permanent magnet is attracted and repelled by an alternating magnetic field generated by the electromagnets, whereby the movable member is reciprocated.

The movable member is disposed, with a slight clearance, between electromagnets oppositely arranged on both sides across the reciprocating path. The slight clearance needs to be maintained. Therefore, in the first type described above, for example, both ends of the movable member are slidably held to maintain the clearance (Japanese Examined Patent Application Publication No. 57-30984).

In the second type described above, the movable member has a permanent magnet. Therefore, in addition to attracting force and repelling force in the reciprocating direction, a transverse force with respect to the reciprocating direction acts on the movable member. Thus, torque about the longitudinal axis of the movable member might be generated. Generally, the permanent magnet attached to the movable member has a square cross section. Therefore, if the permanent magnet is inclined about the longitudinal axis by torque, an attracting force by one electromagnet becomes larger than that by the other electromagnet, which might cause friction of the permanent magnet against the one electromagnet. In general, each end of the movable member is designed to be held by means of a piston having a circular cross section and a cylinder slidably encasing the piston. Therefore, the inclination of the movable member about the longitudinal axis cannot be prevented. In order to avoid this inclination, a device in which each end of the movable member is supported by a diaphragm or a cross-shaped support spring having flexibility in the reciprocating direction and stiffness about the axis is disclosed (Japanese Unexamined Patent Application Publication No. 2002-213354). However, such support members restrict the motion of the movable member in the longitudinal direction, which is not preferable for a fluid device.

SUMMARY OF THE INVENTION

In view of the foregoing, it is an object of the present invention to provide an electromagnetic reciprocating fluid device in which the motion of the movable member in the longitudinal direction is not excessively restrained and the inclination of the movable member about the longitudinal axis is prevented.

The present invention provides an electromagnetic reciprocating fluid device including a movable member reciprocatable along a predetermined axis, an electromagnetic drive unit for driving the movable member along the predetermined axis by generating a magnetic field acting on the movable member, and a support unit for slidably supporting both ends of the movable member. The electromagnetic reciprocating fluid device generates a fluid flow by reciprocating the movable member. The support unit slidably supports the movable member so as to resist torque imposed on the movable member about the axis.

Since the movable member is supported at the both ends thereof so as to resist a torque which may be imposed on the movable member, the above-described problems in the conventional technique will be solved.

Specifically, the support unit includes a first support unit for supporting one end of the movable member and a second support unit for supporting the other end. The first support unit has a first piston secured to the one end of the movable member and a first cylinder encasing the first piston, and the first piston is slidable along the longitudinal axis of the first cylinder which is parallel to or coaxial with the above-mentioned predetermined axis. The second support unit has a second piston secured to the other end of the movable member and a second cylinder encasing the second piston, and the second piston is slidable along the longitudinal axis of the second cylinder which is parallel to and apart a predetermined distance from the longitudinal axis of the first cylinder.

With this configuration, the first and second pistons are slidable along the respective axes parallel to and spaced from each other. Therefore, even if a torque is imposed on the movable member, the first and second pistons are prevented from rotating about the respective axes. Thus, the inclination of the movable member can also be prevented.

As another example, the longitudinal axes of the first cylinder and the second cylinder are aligned with the predetermined axis, and at least either the first cylinder and the first piston encased in the first cylinder or the second cylinder and the second piston encased in the second cylinder have a non-circular cross section. Thus, even if torque about the predetermined axis is imposed on the movable member, it is possible to prevent the at least one piston from rotating about the longitudinal axis of the cylinder encasing the piston.

The present invention also provides an electromagnetic reciprocating fluid device including a movable member having a permanent magnet and reciprocatable along a predetermined axis, an electromagnetic drive unit for driving the movable member along the predetermined axis by generating an alternating magnetic field acting on the permanent magnet, and a support unit for slidably supporting both ends of the movable member. The electromagnetic reciprocating fluid device generates a fluid flow by reciprocating the movable member. The permanent magnet has a cylindrical shape extending in the reciprocating direction of the movable member, and both sides of the permanent magnet with respect to a plane including the axis of the permanent magnet have opposite magnetic polarities.

In this device, since the permanent magnet has a circular cross section, even if the permanent magnet is rotated about the axis thereof, the clearance between the permanent magnet and the electromagnet does not change. Thus, it is possible to prevent the friction of the permanent magnet against the electromagnet.

Furthermore, the present invention provides an electromagnetic reciprocating fluid device in which:

the electromagnetic drive unit has first and second electromagnets disposed on both sides of the movable member;

the electromagnet each have a central magnetic pole, and first and second side magnetic poles disposed on both sides of the central magnetic pole in the reciprocating direction of the movable member so as to be spaced a predetermined distance from the central magnetic pole;

the central magnetic pole and the first and second side magnetic poles of each of the first and second electromagnets are alternately magnetized with opposite polarities so that the central magnetic pole has a magnetic polarity opposite to that of the first and second side magnetic poles and that the central magnetic poles and the first and second side magnetic poles of the first electromagnet have magnetic polarities opposite to those of the second electromagnet, respectively;

the permanent magnet includes a first permanent magnet and a second permanent magnet spaced a predetermined distance from each other in the reciprocating direction of the movable member such that the first permanent magnet is magnetically attracted and repelled according to the relationship between the first side magnetic poles and the central magnetic poles and the second permanent magnet is magnetically attracted and repelled according to the relationship between the central magnetic poles and the second side magnetic poles; and, both sides of the first permanent magnet have opposite magnetic polarities with respect to a first plane including the axis of the first permanent magnet and inclined at a predetermined angle with respect to a plane vertical to a flux path generated between the first side magnetic poles of the first and second electromagnets, while both sides of the second permanent magnet have opposite magnetic polarities with respect to a second plane including the axis of the second permanent magnet and inclined oppositely to the first plane at a predetermined angle with respect to a plane vertical to a flux path generated between the second side magnetic poles of the first and second electromagnets.

In this device, the first and second planes of the respective first and second cylindrical permanent magnets on which the polarity is reversed are inclined oppositely to each other. Therefore, it is possible to cancel torques about the axis which are imposed on the movable member which are caused by attracting or repelling electromagnetic forces generated by interaction of the permanent magnets and the electromagnets.

Specifically, the electromagnetic reciprocating fluid device may has a pair of spring members disposed at both ends of the movable member and applying a biasing force toward the center of the movable member in the axial direction.

In a case where the permanent magnet remains attracted to the side magnetic poles when an electromagnetic force is not applied to the permanent magnet, the spring members are strained. Therefore, when an electromagnetic force is applied in this state, a biasing force of the strained spring members can help the movable member start to move.

Further, with this configuration, it is possible to freely determine the natural frequency of the movable part including the movable member and the pistons, which is determined by the mass of the movable part and the spring constant of the spring member. This is useful for reciprocation control.

In the electromagnetic reciprocating fluid device according to the present invention, as described above, it is possible to support the movable part including the permanent magnets, the magnet holding member, and the pistons, against a biasing force in the reciprocating direction and a torque about the reciprocating axis acting on the movable part, or to prevent the generation of a torque.

DETAILED DESCRIPTION OF THE INVENTION

An embodiment of the present invention will now be described with reference to the accompanying drawings.

Figure 1:
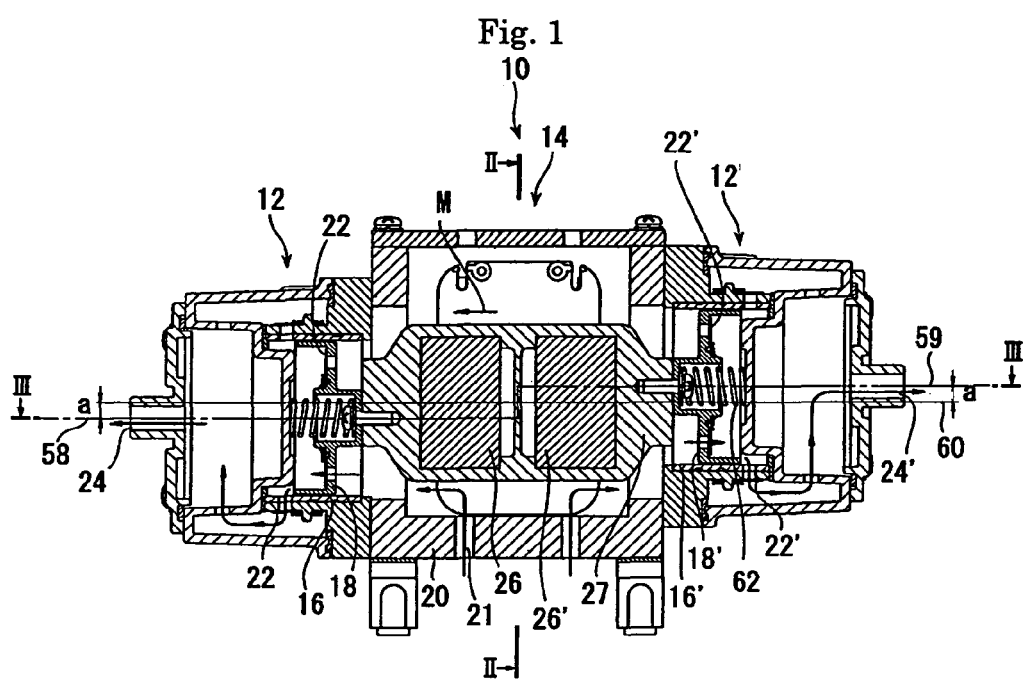
FIG. 1 is a cross-sectional view taken along line I-I of FIG. 2, showing a first embodiment of the present invention.
Figure 2:
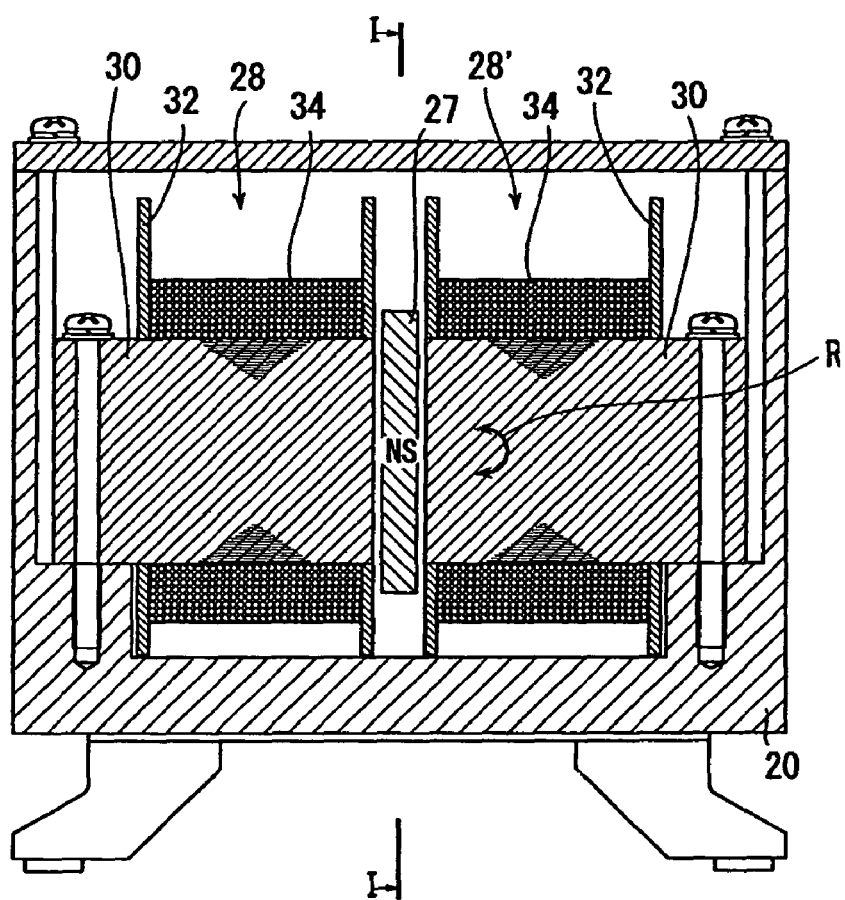
FIG. 2 is a cross-sectional view taken along line II-II of FIG. 1.
Figure 3:
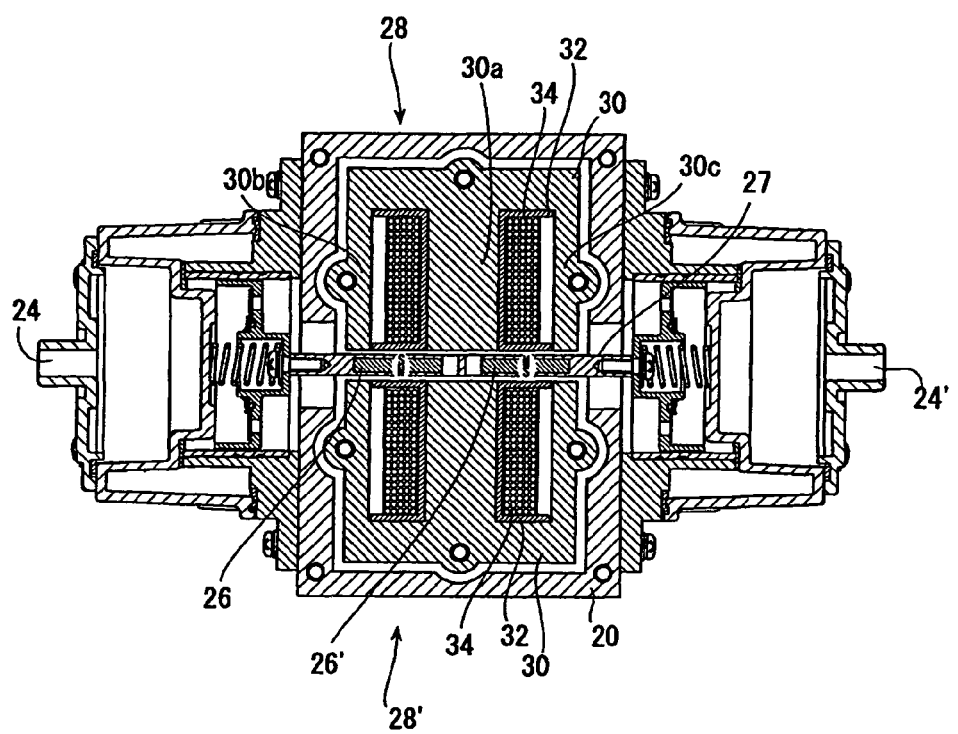
FIG. 3 is a cross-sectional view taken along line III-III of FIG. 1.

FIGS. 1 to 3 show a first embodiment of an electromagnetic reciprocating fluid device 10 according to the present invention. FIG. 1 is a cross-sectional view taken along line I-I of FIG. 2; FIG. 2 is a cross-sectional view taken along line II-II of FIG. 1; and FIG. 3 is a cross-sectional view taken along line III-III of FIG. 1.

As shown in FIGS. 1 and 2, the electromagnetic reciprocating fluid device 10 has first and second piston-cylinder assemblies 12, 12' disposed on both left and right sides thereof, and a drive part 14 disposed at the center thereof.

The first and second piston-cylinder assemblies 12, 12' have cylinders 16, 16', and pistons 18, 18', respectively. The pistons are reciprocated in the right and left directions (as viewed in FIGS. 1 and 3) in the respective cylinders, thereby sucking a fluid such as air from an inlet 21 formed in a central housing 20 and discharging the fluid through check valves 22, 22' from respective outlets 24, 24' formed at the left and right ends of the fluid device 10, as shown by arrows in FIG. 1.

As shown in FIG. 1, the left and right cylinders 12, 12' are arranged such that longitudinal axis lines thereof extending in the right-and-left direction are offset by a distance a in opposite directions.

As shown in FIGS. 2 and 3, the pistons 18, 18' are connected by means of a movable member 27 that is generally in the shape of a plate and has a pair of permanent magnets 26, 26'. The permanent magnets 26, 26' are each magnetized with opposite polarities of the N-pole and S-pole on the left and right sides as viewed in FIG. 2 such that the left-side permanent magnet 26 and the right-side permanent magnet 26' are magnetized oppositely to each other. In other words, when viewed from the front side of FIG. 1 the permanent magnet 26 is magnetized to the N-pole and the permanent magnet 26' is magnetized to the S-pole. On the other hand, when viewed from the back side of FIG. 1, the permanent magnet 26 is magnetized to the S-pole and the permanent magnet 26' is magnetized to the N-pole.

As shown in FIGS. 2 and 3, a drive part 14 at the center of the device has a pair of electromagnets 28, 28' disposed on both sides of the movable member 27. Each electromagnet has an E-shaped core 30, and a coil 34 wound around a coil form 32 formed around a central magnetic pole 30a of the E-shaped core. The central magnetic poles, left-side magnetic poles 30b, and right-side magnetic poles 30c of the both electromagnets are oppositely arranged across the movable member 27 with slight clearances between the poles and the movable member.

By applying an electric current to the electromagnets 28, 28', for example, the central magnetic pole of the electromagnet 28 is magnetized to the S-pole and the left-side and right-side magnetic poles are magnetized to the N-poles, while the central magnetic pole of the electromagnet 28' facing the electromagnet 28 is magnetized to the N-pole and the left-side and right-side magnetic poles are magnetized to the S-poles. In this case, the permanent magnet 26 is repelled by the central magnetic poles and attracted by the left-side magnetic poles, while the permanent magnet 26' is attracted by the central magnetic poles and repelled by the right-side magnetic poles. Thus, the permanent magnets are subject to a force moving the permanent magnets together with the movable member 27 in the leftward direction indicated by an arrow M in FIG. 1. Therefore, by applying an alternating current to these electromagnets, the central magnetic poles and the left-side and right-side magnetic poles are alternately magnetized to different magnetic poles. Thus, the permanent magnets of the magnet holding member is driven in the right and left directions, whereby the pistons 18, 18' slide in the respective cylinders, generating a fluid flow indicated by arrows in FIG. 1.

In a case where surfaces of the permanent magnets 26, 26' facing magnetic pole surfaces of the cores 30 are flat as in this embodiment, the movable member 27 is subject to a torque rotating the movable member in either of directions as indicated by an arrow R in FIG. 2, except when attracting forces between the pair of electromagnets 28, 28' and the permanent magnets 26, 26' are balanced at a neutral position. Therefore, if a resisting force against this torque is not applied, the permanent magnets 26, 26' or the movable member 27 might contact with the electromagnets 28, 28' or other fixed members. In this embodiment, as described above, the axis lines 58, 59 of the first and second piston-cylinder assemblies 12, 12' are non-coaxial, and are vertically offset by a distance a from an axis 60 of the movable member 27. Therefore, it is possible to resist the torque, thereby preventing the rotation of the movable member.

In the illustrated embodiment, a compression coil spring 62 is disposed in each piston-cylinder assembly. This compression coil spring applies a biasing force toward the center of the movable part composed of the permanent magnets 26, 26', the movable member 27, and the pistons 18, 18', in the axial direction (right-and-left direction in FIG. 1). For example, in a case where the permanent magnet remains attracted to either of the left-side and right-side magnetic poles when an electric current is not applied to the electromagnets 28, 28' and an electromagnetic force is not applied to the permanent magnet, the springs are strained. Therefore, when an electromagnetic force is applied in this state, biasing forces of the springs can help the movable member start to move. Further, the natural frequency of the movable part, which is determined by the mass of the movable part and the springs constant of the compression coil springs 62, can be freely determined by determining the spring constant.

Figure 4:
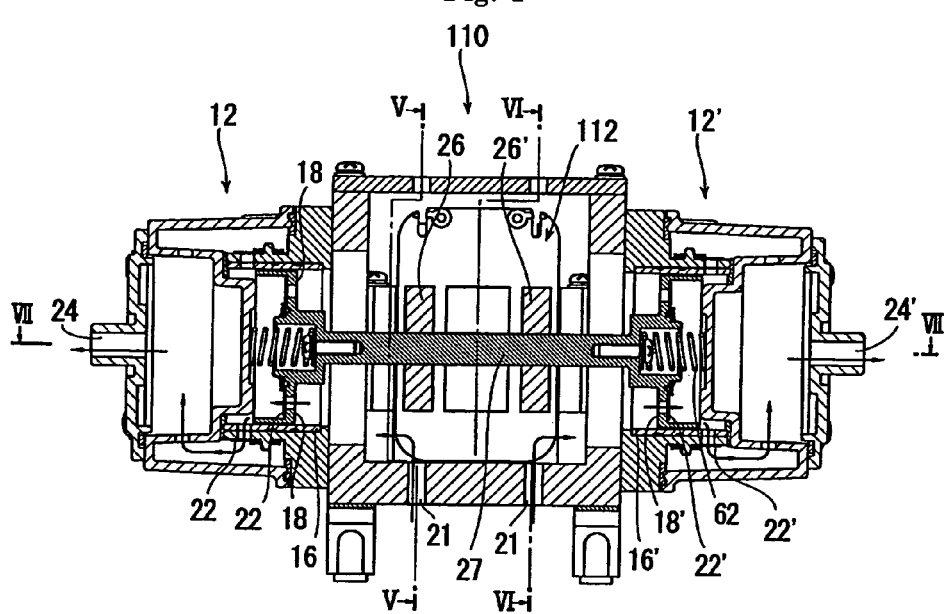
FIG. 4 is a cross-sectional view taken along line IV-IV of FIG. 5, showing a second embodiment of the present invention.
Figure 5:
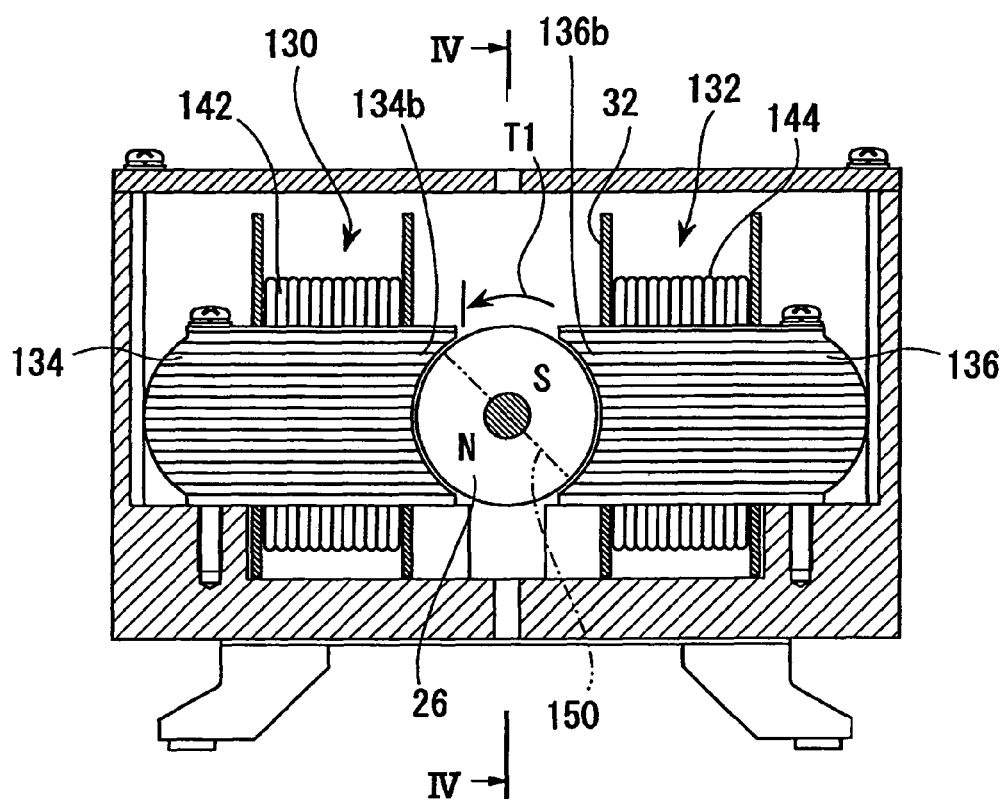
FIG. 5 is a cross-sectional view taken along line V-V of FIG. 4.
Figure 6:
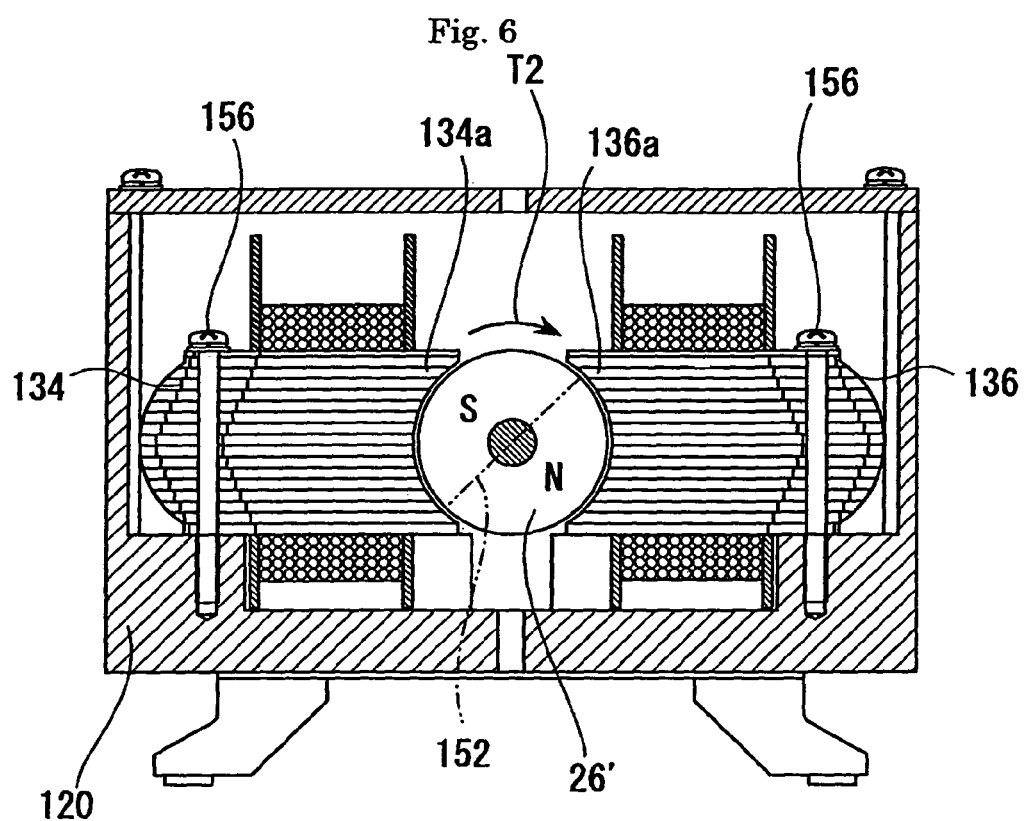
FIG. 6 is a cross-sectional view taken along line VI-VI of FIG. 4.
Figure 7:
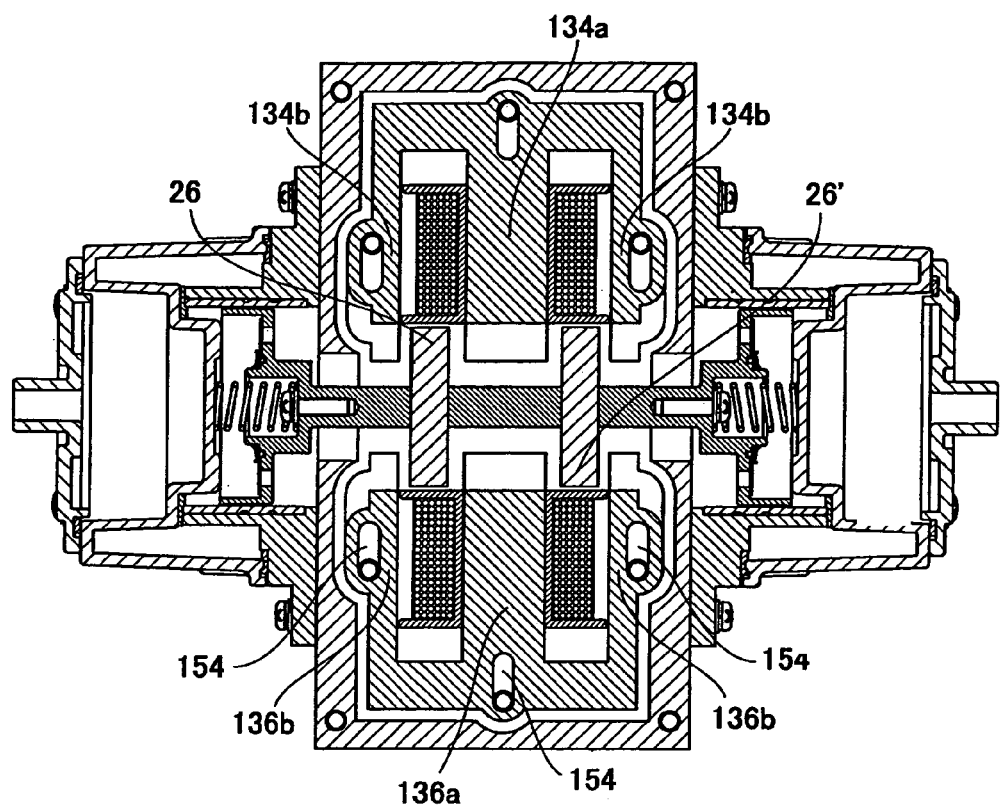
FIG. 7 is a cross-sectional view taken along line VII-VII of FIG. 4.

FIGS. 4 to 7 show a second embodiment of the electromagnetic reciprocating fluid device 110 according to the present invention. FIG. 4 is a cross-sectional view taken along line IV-IV of FIG. 5; FIG. 5 is a cross-sectional view taken along line V-V of FIG. 4; FIG. 6 is a cross-sectional view taken along line VI-VI of FIG. 4; and FIG. 7 is a cross-sectional view taken along line VII-VII of FIG. 4. The configuration of this electromagnetic reciprocating fluid device 110 is generally the same as that of the above-described first embodiment. Therefore, the same elements as those in the first embodiment are denoted by the same reference numerals. This electromagnetic reciprocating fluid device 110 is characterized in that permanent magnets 26, 26', which are plate-shaped in the above-described first embodiment, have a cylindrical shape. In the illustrated example, the permanent magnets are short in the axial direction and disk-shaped. These disk-shaped permanent magnets 26, 26' are arranged coaxially with a movable member 27 having a cylindrical shape. First and second piston-cylinder assemblies 12, 12' disposed on both sides of the movable member 27 are also coaxial with the movable member.

As shown in FIGS. 5 and 7, the disk-shaped magnets 26, 26' are magnetized such that both sides thereof with respect to respective virtual planes 150, 152 including the axis line of the disk-shaped magnets have opposite magnetic polarities. The virtual planes 150, 152 are oppositely inclined at a predetermined angle with respect to a vertical plane (as viewed in FIGS. 5 and 6) including the axis line.

In the above-described configuration, if coils 142, 144 are energized such that central magnetic poles 134a, 136a of respective electromagnets 130, 132 have opposite magnetic polarities (for example, the central magnetic pole 134a is magnetized to the S-pole, while the central magnetic pole 136a is magnetized to the N-pole), the disk-shaped magnet 26 is attracted by the central magnetic poles 134a, 136a, while the disk-shaped magnet 26' is repelled by the central magnetic poles 134a, 136a and attracted by the right-side magnetic poles 134b, 136b. The resultant force of electromagnetic forces acting on the disk-shaped magnets 26 and 26' is a force in the rightward direction in FIG. 4, thereby moving a movable part 112 composed of the disk-shaped magnets, the movable member 27 to which the disk-shaped magnets are secured, and the first and second pistons 18, 18' connected to both sides of the movable member, in the rightward direction in FIG. 4.

When the movable part 112 has been moved rightward in FIG. 4 to a position where the disk-shaped magnet 26' faces the right-side magnetic poles 134b, 136b, an electric current in a direction opposite to that of the above case is then applied to the coils 142, 144 to generate a force for moving the movable part 112 in the leftward direction in FIG. 4. Then, the central magnetic pole 134a of the electromagnet 130 on the left side in FIG. 5 is magnetized to the N-pole, while the central magnetic pole 136a facing the central magnetic pole 134a is magnetized to the S-pole, whereby the disk-shaped magnet 26 in FIG. 5 is subject to a torque Ti rotating the disk-shaped magnet 26 in the counterclockwise direction. Shapedwise, the disk-shaped magnet 26' in FIG. 6 is subject to a torque T2 rotating the disk-shaped magnet 26' in the clockwise direction. In other words, the torques acting on the respective cylindrical magnets 26, 26' are torques rotating the respective magnets 26, 26' in opposite directions. Thus, these torques cancel each other, whereby it is possible to prevent the movable part 112 from rotating in any direction about an axis of the movable direction.

Further, in this embodiment, cores 134, 136 of the respective fixed electromagnets 130, 132 are each a laminate of identically shaped thin plates, such as silicon steel plates. Adjacent thin plates are displaced from each other such that the magnetic pole portion faces the disk-shaped magnets 26, 26' with an appropriate clearance therebetween. In this configuration, these thin plates are fixed to a body casing 120 by means of fixing screws 156. Therefore, screw holes 154 formed in the thin plates forming the cores 134, 136 are elongated holes, as shown in FIG. 7.

Figure 8:
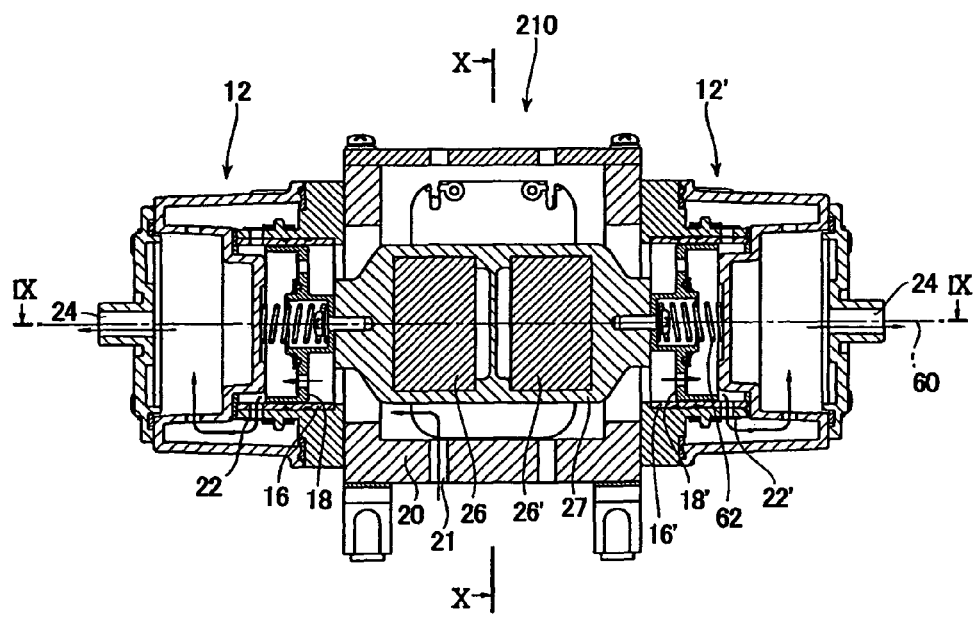
FIG. 8 is a cross-sectional view taken along line VIII-VIII of FIG. 10, showing a third embodiment of the present invention.
Figure 9:
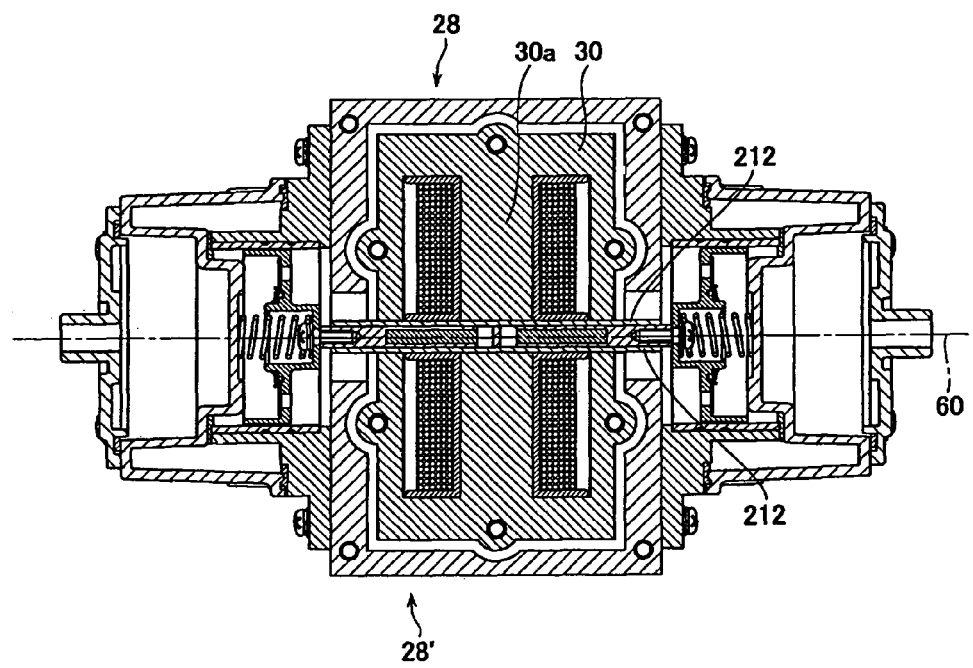
FIG. 9 is a cross-sectional view taken along line IX-IX of FIG. 8.
Figure 10:
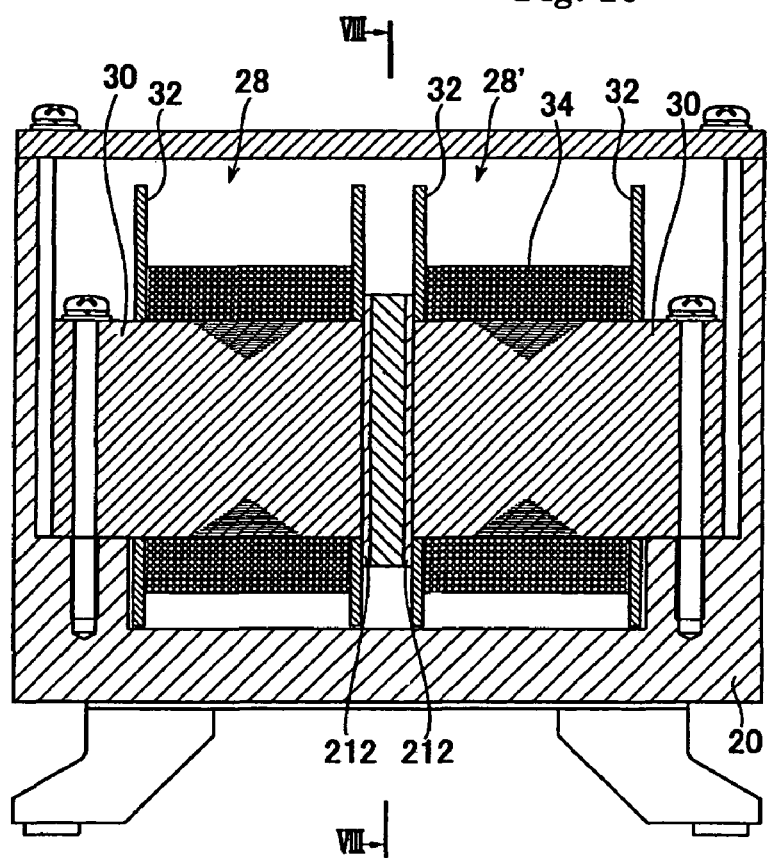
FIG. 10 is a cross-sectional view taken along line X-X of FIG. 8.
Figure 11:
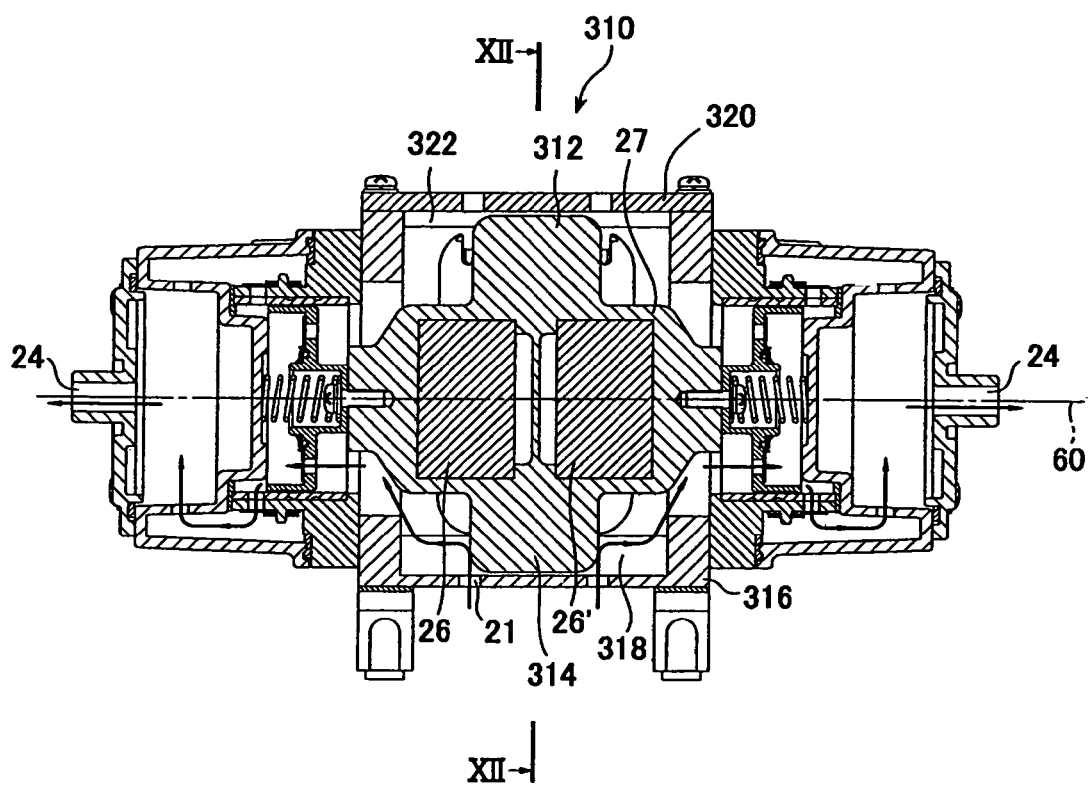
FIG. 11 is a cross-sectional view taken along line XI-XI of FIG. 12, showing a fourth embodiment of the present invention.

FIGS. 8 to 10 show a third embodiment of an electromagnetic reciprocating fluid device 210 according to the present invention. FIG. 8 is a cross-sectional view taken along line VIII-VIII of FIG. 10; FIG. 9 is a cross-sectional view taken along line IX-IX of FIG. 8; FIG. 10 is a cross-sectional view taken along line X-X of FIG. 8; and FIG. 11 is a cross-sectional view taken along line XI-XI of FIG. 11. The configuration of this electromagnetic reciprocating fluid device 210 is generally the same as that of the above-described first embodiment. Therefore, the same elements as those in the first embodiment are denoted by the same reference numerals. This electromagnetic reciprocating fluid device 210 is characterized in that guide members 212 are disposed in a space between a movable member 27 including permanent magnets 26, 26' and a pair of electromagnets 28, 28'. With this configuration, it is possible to resist a torque about an axis 60 generated when the permanent magnets 26, 26' are attracted by the electromagnets 28, 28', thereby preventing the rotation of the movable member.

Figure 12:
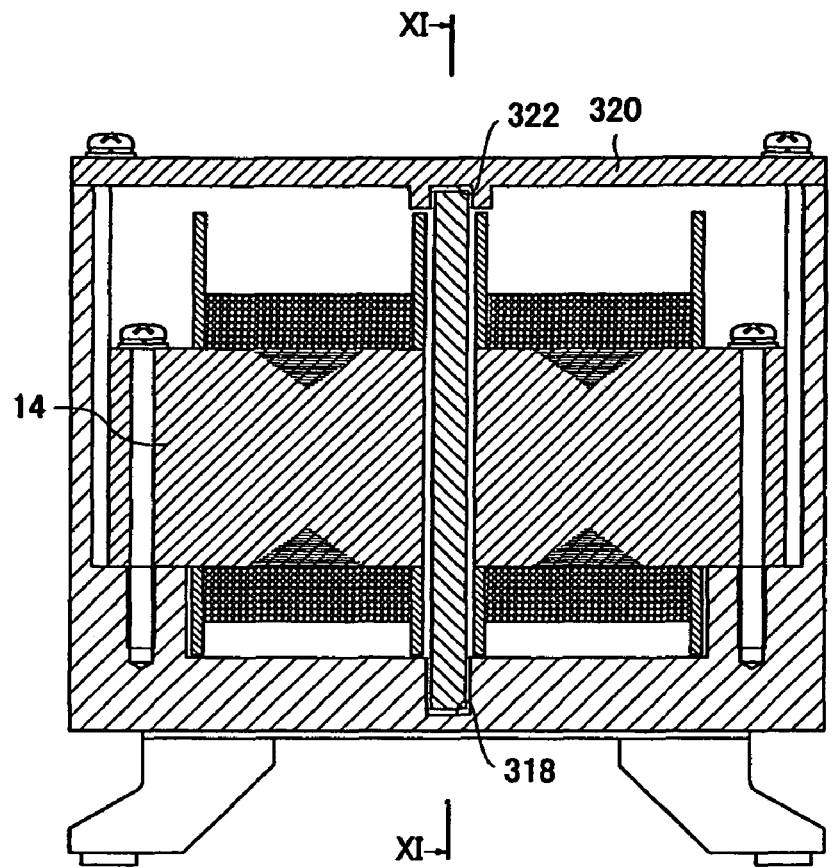
FIG. 12 is a cross-sectional view taken along line XII-XII of FIG. 11.

FIGS. 11 and 12 show a fourth embodiment of an electromagnetic reciprocating fluid device 310 according to the present invention. FIG. 11 is a cross-sectional view taken along line XI-XI of FIG. 12, and FIG. 12 is a cross-sectional view taken along line XII-XII of FIG. 11. In the figures, a movable member 27 has extending portions 312, 314 extending upwardly and downwardly, respectively, in FIG. 11, and these extending portions slidably engage with a guide groove 318 formed on a body housing 316 and a guide groove 322 formed on a lid member 320. With this configuration, it is possible to resist a torque about the axis 60 generated when the permanent magnets 26, 26' are attracted by the electromagnets 28, 28', thereby preventing the rotation of the movable member 27.

In this embodiment, there are provided the two extending portions 312, 314 extending upwardly and downwardly, respectively, and the two guide grooves 318, 322 with which the extending portions 312, 314 are slidably engaged, respectively. Alternatively, only one of the upper and lower extending portions, and the corresponding guide groove may be provided.

The invention claimed is:

1. An electromagnetic reciprocating fluid device comprising:
a stationary housing having a first end and a second end;
a movable member disposed in said stationary housing and having a first end and a second end, said movable member comprising a permanent magnet and being reciprocable along a predetermined axis extending through said first end and said second end of said stationary housing;
a support device configured to support said movable member reciprocally along the predetermined axis, said support device comprising a first support unit disposed on said first end of said stationary housing to support said first end of said movable member and a second support unit disposed on said second end of said stationary housing to support said second end of said movable member; and
an electromagnetic drive unit securely disposed in said stationary housing and being configured to drive said movable member along the predetermined axis by generating an alternating magnetic field acting on said permanent magnet of said movable member;
wherein said first support unit comprises a first cylinder, said first cylinder being a sole cylinder securely connected to said first end of said housing, and a first piston, said first piston being a sole piston securely connected to said first end of said movable member and reciprocally received in said first cylinder, and being slidable relative to said first cylinder along a longitudinal axis of said first cylinder that is parallel to or coaxial with the predetermined axis; and
said second support unit comprises a second cylinder, said second cylinder being a sole cylinder securely connected to said second end of said housing, and a second piston, said second piston being a sole piston securely connected to said second end of said movable member and reciprocally received in said second cylinder, said second piston being slidable relative to said second cylinder along a longitudinal axis of said second cylinder that is spaced apart from and parallel to the longitudinal axis of said first cylinder.

2. An electromagnetic reciprocating fluid device according to claim 1, wherein:
said movable member is a plate-shaped member having a first surface and a second surface, said first surface and said second surface being parallel to each other and extending along the predetermined axis;
said permanent magnet comprises a pair of plate-shaped first and second permanent magnets, said first and second permanent magnets being spaced a predetermined distance from each other in a direction of the predetermined axis and secured to said plate-shaped member, each of said first and second permanent magnets having first and second magnetic pole surfaces facing and parallel to said first and second surfaces of said movable member respectively; said first and second magnetic pole surfaces of said first permanent magnet being magnetized to a N-pole and a S-pole, respectively, said the first and second magnetic pole surfaces of the second permanent magnet being magnetized to a S-pole and a N-pole, respectively;
said electromagnetic drive unit includes a first electromagnet and a second electromagnet disposed on first and second sides of said movable member, respectively, and facing said first surface and said second surface of said movable member, respectively;
each of said first and second electromagnets have a central magnetic pole, and first and second side magnetic poles disposed on first and second sides of the central magnetic pole, respectively, in a direction of reciprocation of said movable member and spaced apart from said central magnetic pole;
said central magnetic pole and said first and second side magnetic poles of each of said first and second electromagnets are alternately magnetized with opposite polarities so that said central magnetic pole has a polarity opposite to that of said first and second side magnetic poles and that said central magnetic pole and said first and second side magnetic poles of said first electromagnet have magnetic polarities opposite to those of said second electromagnet, respectively; and,
said first permanent magnet is magnetically attracted and repelled according to the relationship between said first side magnetic poles and said central magnetic poles, while said second permanent magnet is magnetically attracted and repelled according to the relationship between said central magnetic poles and said second side magnetic poles.

3. An electromagnetic reciprocating fluid device according to claim 1, further comprising first and second spring members disposed at first and second ends of said movable member, respectively, and applying biasing forces toward the center of said movable member in an axial direction thereof.

* * * * *